United States Patent
Tachikawa

(10) Patent No.: US 7,669,221 B2
(45) Date of Patent: Feb. 23, 2010

(54) TV BROADCAST COOPERATIVE TYPE DATA PERUSAL APPARATUS, TV BROADCAST COOPERATIVE TYPE DATA PERUSAL METHOD, AND STORAGE MEDIUM

(75) Inventor: Hirohide Tachikawa, Kanagawa (JP)

(73) Assignee: Canon Kabushiki Kaisha (JP)

( * ) Notice: Subject to any disclaimer, the term of this patent is extended or adjusted under 35 U.S.C. 154(b) by 658 days.

(21) Appl. No.: 10/957,939

(22) Filed: Oct. 4, 2004

(65) Prior Publication Data

US 2005/0086700 A1 Apr. 21, 2005

Related U.S. Application Data

(63) Continuation of application No. 10/016,681, filed on Oct. 23, 2001, now Pat. No. 6,802,078.

(30) Foreign Application Priority Data

Oct. 27, 2000 (JP) .............................. 2000-329601

(51) Int. Cl.
*H04N 7/173* (2006.01)
*H04N 5/445* (2006.01)

(52) U.S. Cl. ........................... 725/110; 725/112; 725/51

(58) Field of Classification Search .................. 725/110, 725/112, 51
See application file for complete search history.

(56) References Cited

U.S. PATENT DOCUMENTS

| 5,973,692 | A | * | 10/1999 | Knowlton et al. | ........... 715/835 |
| 6,005,565 | A | | 12/1999 | Legall et al. | ................. 345/721 |
| 6,490,575 | B1 | * | 12/2002 | Berstis | ........................... 707/3 |
| 6,606,748 | B1 | | 8/2003 | Tomioka et al. | ............... 725/50 |
| 6,625,644 | B1 | | 9/2003 | Zaras | ......................... 709/217 |
| 6,637,032 | B1 | | 10/2003 | Feinleib | ...................... 725/110 |
| 6,802,078 | B2 | * | 10/2004 | Tachikawa | .................. 725/110 |
| 2003/0159150 | A1 | | 8/2003 | Chernock et al. | ............. 725/58 |

FOREIGN PATENT DOCUMENTS

| WO | WO-98/17064 | | 4/1998 |
| WO | WO 9817064 A1 | * | 4/1998 |

* cited by examiner

*Primary Examiner*—James Sheleheda
(74) *Attorney, Agent, or Firm*—Rossi, Kimms & McDowell LLP

(57) ABSTRACT

A TV broadcast cooperative type data perusal apparatus is provided that can establish connection to websites in which is provided information related to the subject matter of a program that is being broadcast, and can simply peruse the information related to the subject matter from these websites, even when no website address information is appended as descriptor information for searching to the program being broadcast, provided that the information related to the subject matter in the program being broadcast is appended to the program as the descriptor information for searching.

2 Claims, 5 Drawing Sheets

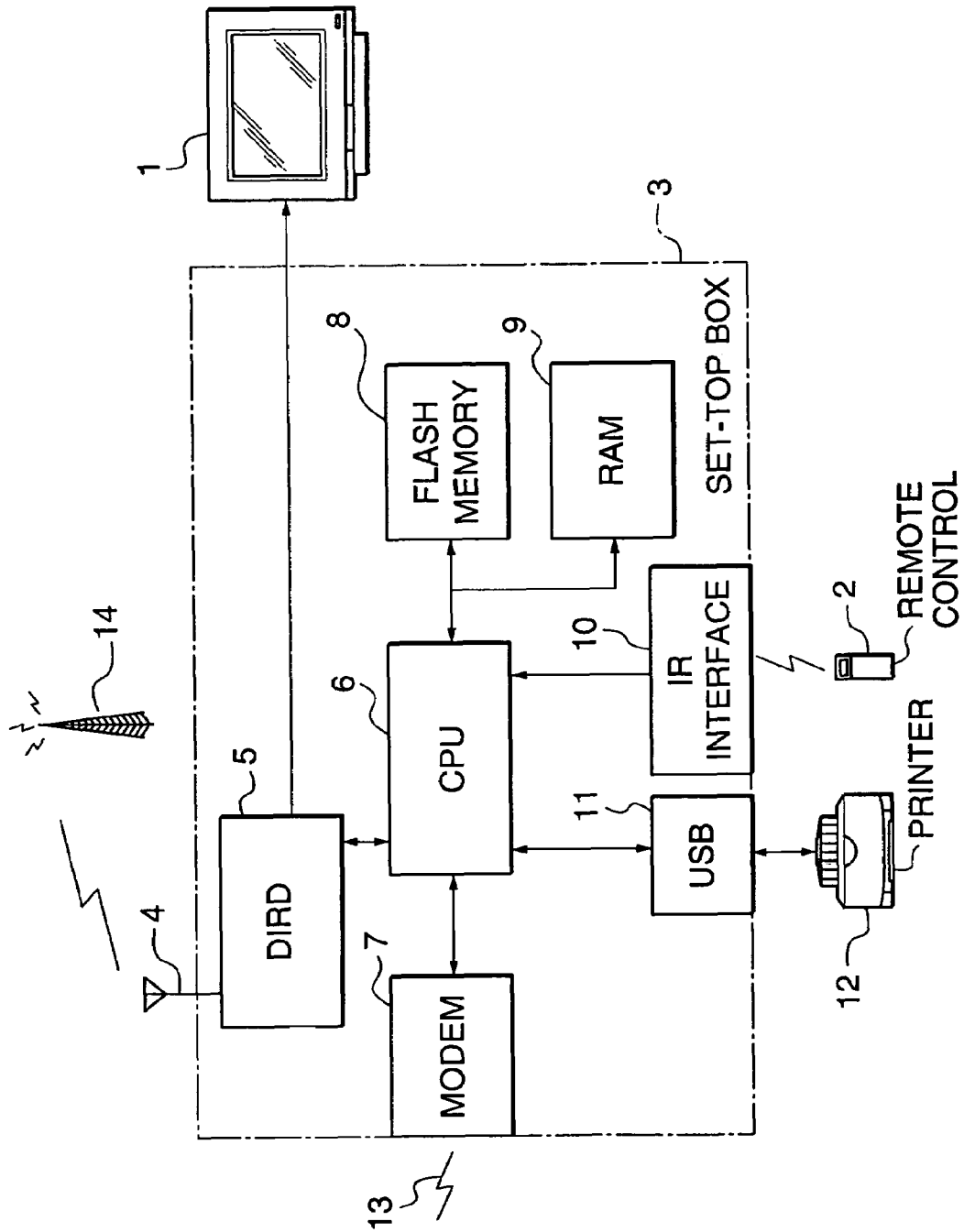

FIG. 2

| | |
|---|---|
| animal | http://www.abcde.co.jp/animal/index.html |
| architecture | http://www.abcde.co.jp/architecture/index.html |
| history | http://www.abcde.co.jp/history/index.html |
| movie | http://www.abcde.co.jp/movie/index.html |
| music | http://www.abcde.co.jp/music/index.html |
| travel | http://www.abcde.co.jp/travel/index.html |
| ⋮ | ⋮ |
| animalA | http://www.abcde.co.jp/animal/animalA.html |
| animalB | http://www.abcde.co.jp/animal/index.html |
| elephant | http://www.abcde.co.jp/animal/elephant.html |
| lion | http://www.abcde.co.jp/animal/lion.html |
| tiger | http://www.abcde.co.jp/animal/tiger.html |
| cheetah | http://www.abcde.co.jp/animal/cheetah.html |
| zebra | http://www.abcde.co.jp/animal/zebra.html |
| hippopotamus | http://www.abcde.co.jp/animal/index.html |
| giraffe | http://www.abcde.co.jp/animal/giraffe.html |
| kangaroo | http://www.abcde.co.jp/animal/kangaroo.html |
| gorilla | http://www.abcde.co.jp/animal/gorilla.html |
| ⋮ | ⋮ |

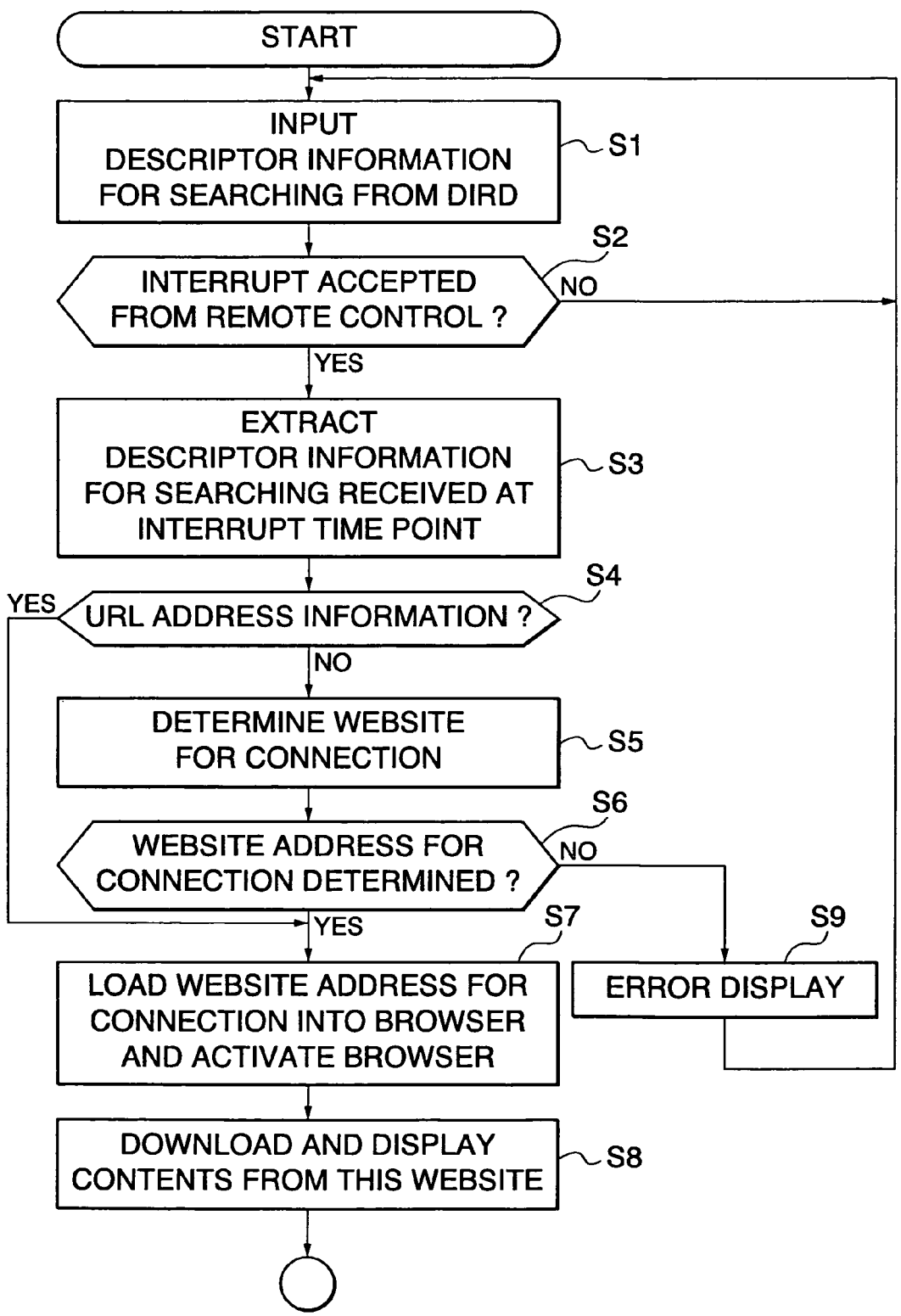

FIG. 5

| | | |
|---|---|---|
| animal | 動物 | http://www.abcde.co.jp/animal/index.html |
| architecture | 建築 | http://www.abcde.co.jp/architecture/index.html |
| history | 歴史 | http://www.abcde.co.jp/history/index.html |
| movie | 映画 | http://www.abcde.co.jp/movie/index.html |
| music | 音楽 | http://www.abcde.co.jp/music/index.html |
| travel | 旅行 | http://www.abcde.co.jp/travel/index.html |
| ⋮ | ⋮ | ⋮ |
| africa | アフリカ | http://www.abcde.co.jp/africa/index.html |
| ⋮ | ⋮ | |
| animalA | 動物A | http://www.abcde.co.jp/animal/animalA.html |
| animalB | 動物B | http://www.abcde.co.jp/animal/index.html |
| elephant | 象 | http://www.abcde.co.jp/animal/elephant.html |
| lion | ライオン | http://www.abcde.co.jp/animal/lion.html |
| tiger | 虎 | http://www.abcde.co.jp/animal/tiger.html |
| cheetah | チーター | http://www.abcde.co.jp/animal/cheetah.html |
| zebra | シマウマ | http://www.abcde.co.jp/animal/zebra.html |
| hippopotamus | カバ | http://www.abcde.co.jp/animal/index.html |
| giraffe | キリン | http://www.abcde.co.jp/animal/giraffe.html |
| kangaroo | カンガルー | http://www.abcde.co.jp/animal/kangaroo.html |
| gorilla | ゴリラ | http://www.abcde.co.jp/animal/gorilla.html |
| ⋮ | ⋮ | ⋮ |

TV BROADCAST COOPERATIVE TYPE DATA PERUSAL APPARATUS, TV BROADCAST COOPERATIVE TYPE DATA PERUSAL METHOD, AND STORAGE MEDIUM

This is a Continuation of application Ser. No. 10/016,681 filed Oct. 23, 2001 now U.S. Pat. No. 6,802,078

BACKGROUND OF THE INVENTION

1. Field of the Invention

The present invention relates to a TV broadcast cooperative type data perusal apparatus connected to a television reception device that is capable of receiving a digital television broadcast program to which is appended descriptor information for searching, a TV broadcast cooperative type data perusal method, and a storage medium storing a program that implements the data perusal method.

2. Description of the Related Art

Conventionally, digital television broadcasts have been implemented in video formats such as MPEG2 that include moving image information and sound information. Although MPEG2 is an extremely efficient format for broadcasting of digital programs-and for data broadcasting, it is not directed towards effectiveness for interactive digital broadcasting linked to broadcast of digital programs. Due to this, video formats such as MPEG7 and MPEG21 in-which descriptor information for searching is appended to moving image and sound information are being proposed as formats for interactive digital television broadcasting, which is considered to be the principal technological path forward to the future. With a digital television broadcast to which this type of descriptor information for searching is appended, at the time of broadcasting a commercial message, URL address information for a home page that carries information about a product that is promoted by this commercial message is also transmitted, and accordingly a user in whom the product excites interest, can easily jump, by a simple operation, to a home page upon which is provided detailed information relating to the desired product.

However, in the above described example under current discussion, although, for a program such as a commercial message for which the jump destination website address is clear, it is possible, by using appended URL address information as descriptor information for searching, to implement automatic linking to the website specified by this URL information, by contrast, in the case of a program for which no URL address information on a URL address to a directly related website is appended as descriptor information for searching, it is not possible to link automatically to any desired website.

SUMMARY OF THE INVENTION

It is an object of the present invention to provide a TV broadcast cooperative type data perusal apparatus and a TV broadcast cooperative type data perusal method that can establish connection to websites in which is provided information related to the subject matter of a program that is being broadcast, and can simply peruse the information related to the subject matter from these websites, even when no website address information is appended as descriptor information for searching to the program being broadcast, provided that the information related to the subject matter in the program being broadcast is appended to the program as the descriptor information for searching, and a storage medium storing a program which implements the data perusal method.

To attain the above object, a first aspect-of the present invention provides a TV broadcast cooperative type data perusal apparatus comprising connection means for connecting the apparatus to a television reception device with which a digital television broadcast program to which is appended descriptor information for searching can be viewed, extraction means for extracting the descriptor information for searching appended to the digital television broadcast program, non-volatile storage means storing related website information for determining websites upon the internet that are related to the descriptor information for searching, determination means for determining a website upon the internet to which connection is to be established, based upon the descriptor information for searching extracted by the extraction means and the related website information, internet connection means for establishing connection to the determined website upon the internet to which connection is to be established, and perusal means for downloading contents from the website to which connection has been established, and for perusing the contents via the television reception device.

With the above arrangement, during the broadcast of a program, it is possible simply to connect to a website that carries information related to the subject matter of this broadcast program, and to peruse the information related to the subject matter from this website, even if no website address information is appended to this program broadcast as descriptor information for searching, provided that the information related to the subject matter is appended as the descriptor information for searching.

It is preferable that after connecting to the determined website to which connection is to be established, the perusal means instructs a search engine at the website to which connection has been established, to perform a restricted search for contents of the extracted descriptor information for searching, and downloads the contents obtained as a result of the restricted search.

More preferably, a plurality of items of information arranged in successive layers are appended as the descriptor information for searching to the digital television broadcast program, and the extraction means extracts the plurality of items of information, the determination means determines as the website to which connection is to be established, a website that corresponds to the most significant item of information among the extracted plurality of items of information, and the perusal means transfers all of the less significant items of information that follow the most significant item of information among the extracted plurality of items of information, to a search engine at the determined website to which connection has been established.

Preferably, the perusal means comprises service selection means for selecting a desired service from among a plurality of types of service provided by the website to which connection has been established, and service exploitation means for exploiting the selected service.

Also preferably, the determination means comprises search means for searching candidate websites that are to be the website upon the internet to which connection is to be established, based upon the descriptor information for searching extracted by the extraction means and the related website information, the determining means determining the website to which connection is to be established from the candidate websites obtained by the search.

In this case, it is more preferable that if a plurality of candidate websites have been obtained by the search means, the determination means displays to a user via the television reception device a selection screen for selecting a desired candidate website from among the plurality of candidate websites, and determines the candidate website selected by the user upon the selection screen as the website to which connection is to be established.

Preferably, the determination means comprises search means operable when a plurality of items of descriptor information for searching have been extracted by the extraction means, for searching website information corresponding to the plurality of items of descriptor information for searching extracted from the storage means, and user interface means for displaying to a user via the television reception device a selection screen for selecting desired website information from among website information corresponding to the items of descriptor information for searching obtained by the search means, the determining means determining the website to which connection is to be established based upon the desired website information selected by the user upon the selection screen.

Also preferably, the TV broadcast cooperative type data perusal apparatus according to the present invention further comprises updating means for updating the related website information stored in the storage means.

To attain the above object, a second aspect of the present invention provides a TV broadcast cooperative type data perusal method which performs perusal of data related to a digital television broadcast program using descriptor information for searching appended to the digital television broadcast program that is viewed via a television reception device, comprising the steps of an extraction step of extracting the descriptor information for searching appended to the digital television broadcast program, a determination step of determining a website upon the internet to which connection is to be established, based upon related website information for determining websites upon the internet that are related to the descriptor information for searching, stored in non-volatile storage means, and the descriptor information for searching extracted by the extraction step, an internet connection step of establishing connection to the determined website upon the internet to which connection is to be established, and a perusal step of downloading contents from the website to which connection has been established, and perusing the contents via the television reception device.

To attain the above object, a third aspect of-the present invention provides a computer-readable storage medium that stores a program which performs perusal of data related to a digital television broadcast program using descriptor information for searching appended to the digital television broadcast program that is viewed via a television reception device, the program comprising an extraction module for extracting the descriptor information for searching appended to the digital television broadcast program, a determination module for determining a website upon the internet to which connection is to be established, based upon related website information for determining websites upon the internet that are related to the descriptor information for searching, stored in non-volatile storage means, and the descriptor information for searching extracted by the extraction module, an internet connection module for establishing connection to the determined website upon the internet to which connection is to be established, and a perusal module for downloading contents from the website to which connection has been established, and for perusing the contents via the television reception device.

The above and other objects of the invention will become more apparent from the following description taken in conjunction with the accompanying drawings.

BRIEF DESCRIPTION OF THE DRAWINGS

FIG. 1 is a block diagram showing the structure of a TV broadcast cooperative type data perusal apparatus according to a first embodiment of the present invention;

FIG. 2 is a diagram showing an example of the structure of a website reference table that is stored in a flash memory 8 of the TV broadcast cooperative type data perusal apparatus shown in FIG. 1;

FIG. 4 is a flow chart showing an operation during program broadcast of the TV broadcast cooperative type data perusal apparatus shown in FIG. 1; and FIG. 5 is a diagram showing an example of the structure of a website reference table stored in a flash memory that is provided in a TV broadcast cooperative type data perusal apparatus according to a second embodiment of the present invention.

DESCRIPTION OF THE PREFERRED EMBODIMENTS

Figure 3:
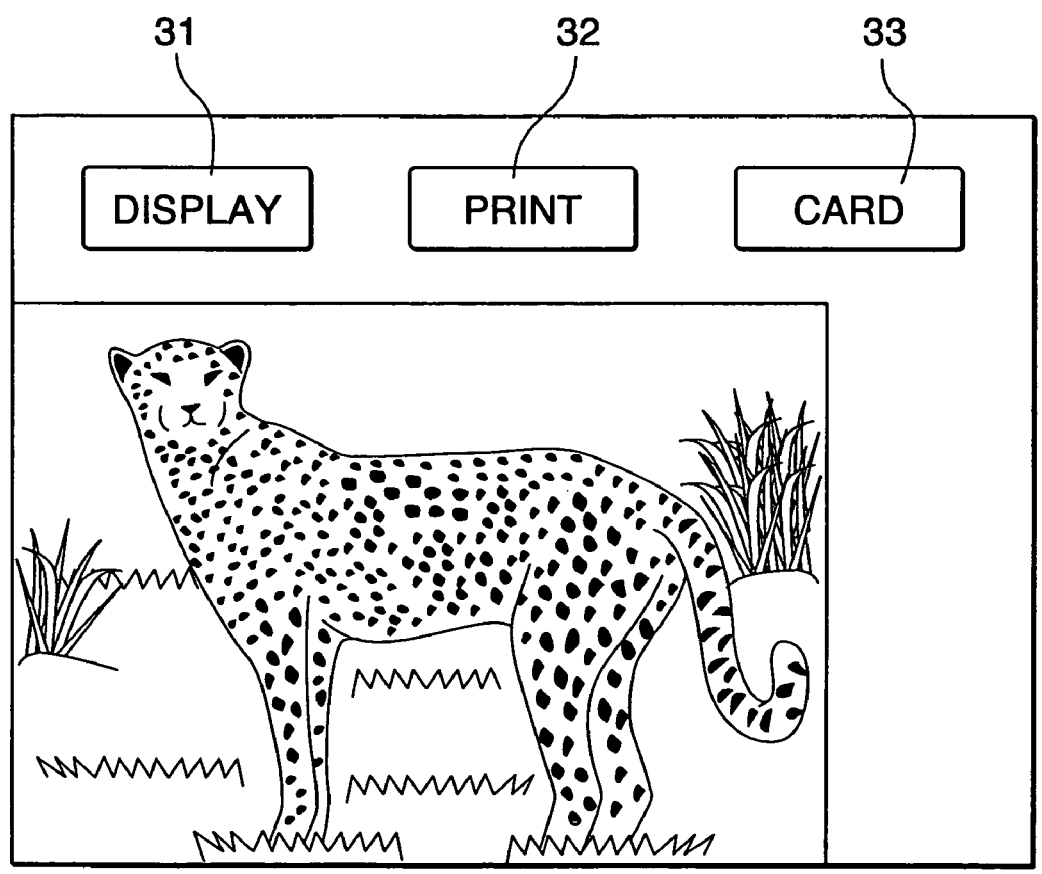
FIG. 3 is a diagram showing an example of display of contents that has been received from a website to which connection has been established by the TV broadcast cooperative type data perusal apparatus shown in FIG. 1.

The present invention will be described in detail with reference to the drawings showing preferred embodiments thereof.

FIG. 1 is a block diagram showing the structure of a TV broadcast cooperative type data perusal apparatus according to a first embodiment of the present invention.

As shown in FIG. 1, this TV broadcast cooperative type data perusal apparatus includes a set-top box 3 that is provided with a function of receiving digital television broadcasts and also with a function of connecting to the internet. The AV signal of the broadcast program that is captured by the receiving function of this set-top box 3 is outputted to a television receiver (hereinafter referred to as the TV) 1, and the TV 1 receives the AV signal and outputs an image and sound.

The set-top box 3 is comprised of an antenna 4 that receives digital broadcast waves that are relayed via a broadcasting tower 14, a DIRD (Digital Integrated Receiver Decoder) 5 that performs reception processing including selection, detection and demodulation of the digital broadcast signals, and descrambling and mixing procedures, and a CPU 6 that controls the functions of the set-top box 3 while communicating with the DIRD 5.

To the CPU 6 there are connected a modem 7 that establishes a dial-up connection to the internet via a telephone line 13, a flash memory 8 that stores program code to be executed by the CPU 6 and a website reference table, described hereinafter, a RAM 9 that is used as a work area for the CPU 6, an IR (infra-red) interface 10, and a USB (Universal Serial Bus) interface 11 that is an expansion bus for connection of peripheral devices.

The IR interface 10 is capable of communicating via infrared rays as a transmission medium with a remote control 2 for operating this set-top box 3, and receives infrared signals created by actuation of this remote control 2 by the user and transfers to the CPU 6 signals corresponding to commands that are designated by these received infrared signals. A printer 12 that receives data from the set-top box 3 and performs printing thereof is connected to the USB interface 11.

Next, the structure of a website reference table that is stored in the flash memory 8 will be explained with reference to FIG. 2. FIG. 2 is a diagram showing an example of the structure of the website reference table that is stored in the flash memory 8 of the TV broadcast cooperative type data perusal apparatus shown in FIG. 1.

In the website reference table in the flash memory 8, as shown in FIG. 2, there are stored a number of item pairs, each of which consists of a keyword (an item of descriptor information for searching) and a corresponding detailed information website address that is established in correspondence with the keyword. However, for a keyword for which no detailed information website address is present in correspondence therewith, a generic website address is stored for its genre. For example, while a detailed information website address (http://www.abcde.co.jp/animal/animalA.html) is stored in correspondence to the keyword "animal A", for the keyword "animal B" for which no detailed information website exists, an address (http://www.abcde.co.jp/animal/index.html) for a general animal information website is allocated. In the example shown in FIG. 2, this address of the general animal information website is allocated both to "animal B" and also to "hippopotamus".

The contents of the website reference table can be updated according to change of the website addresses and addition of website addresses thereto. For example, an updating method of downloading information from related websites may be employed. Furthermore, this updating may be performed at fixed time intervals or whenever suitable.

Next, the operation of the first embodiment of the present invention will be explained.

According to the first embodiment, while the user is viewing a digital television broadcast program, and when subject matter appears upon the screen of the TV 1 in which he has an interest, upon operation of the remote control 2, he can connect to a website that contains various digital contents related to the subject matter in question without the requirement to perform any troublesome operation, and he is able to obtain the digital contents related to the subject matter in which he has felt interest from the website to which he is connected.

First, the case of a digital television broadcast program according to the following conditions will be explained. Herein, for the convenience of easy explanation, it is assumed that a program upon the subject of animals is being broadcast upon some digital television broadcasting channel, and that, when an animal A is displayed during this program, the viewer has an interest in this animal. Furthermore, it is assumed that no URL address information is included in the descriptor information for searching that is appended to this digital television broadcast program, but that the name of a subject in this broadcast program (for example here, "animal A") is included therein.

In the set-top box 3, during digital broadcast reception, the DIRD 5 is always performing demodulation processing, and if the digital television broadcast program is one to which descriptors for searching such as specified by the MPEG7 or the MPEG21 format are appended, the received broadcast signal is separated into picture and sound signals and descriptor information for searching, and the descriptor information for searching is transmitted to the CPU 6. The DIRD 5 is always transmitting descriptor information for searching, but the CPU 6 is not normally performing processing related to the descriptor information for searching. In other words, during normal viewing of digital television broadcasts, within the set-top box 3, only the DIRD 5 is operating.

Here, when the animal A is displayed upon the TV 1, if the user operates the remote control 2, the CPU 6 accepts an interrupt via the IR interface 10 to receive the descriptor information for searching ("animal A") that is being transmitted from the DIRD 5 at this time, and starts an enquiry as to correlation with the website that is the associated jump destination.

In this enquiry as to correlation with the website that is the associated jump destination, the CPU 6 refers to the website reference table in the flash memory 8, and finds the keyword ("animal A") that agrees with the descriptor information for searching provided by the DIRD 5. Here, if a keyword that agrees with the descriptor information for searching provided by the DIRD 5 is found from the website reference table, a communication procedure that is required to establish an internet connection via the modem 7 is performed, and a detailed information website address that corresponds to the keyword "animal A" (in this case, "http://www.abcde.co.jp/animal/animalA.html) is loaded into a browser, and the browser is activated. And, when connection is established with the website whose address has been loaded, the contents of the website is downloaded via the modem 7, and is displayed upon the TV 1 via the DIRD 5.

Furthermore, in the event that, although there is no detailed information website, a website of a closely related genre exists, the address of the general animal information website is loaded into the browser, which is activated. For example, the address (http://www.abcde.co.jp/animal/index.html) of the general animal information website is loaded into the browser, which is activated, so that connection to the general animal information website is performed. And the contents of the general information website is transmitted to the TV 1 and is displayed.

Still further, if the keyword corresponding to the descriptor for searching has not been found in the website information table, in other words no corresponding website address has been found in the website information table, then a message to the effect that no detailed information website has been found is displayed upon the screen of the TV 1, and the browser is not activated. By doing this, the user can be apprised of the fact that no detailed information website relating to the subject matter that has caught his interest is available.

In this manner, in the case of a broadcast program to which is appended descriptor information for searching in which names of subject items are contained instead of URL address information, the website reference table is searched for a keyword (for example, "animal A") that agrees with the descriptor information for searching that has been provided by the DIRD 5 upon pressing of a button of the remote control 2, and when such a keyword that agrees with the descriptor information for searching that has been provided by the DIRD 5 has been found from the website reference table, the address of the detailed information website that is set in correspondence with the keyword is loaded as a destination address into the browser and the browser is activated. Accordingly, the user is able to be connected to a website that has the detailed information upon the subject that he desires, and he is able to easily peruse detailed information upon the subject that has caught his interest from the website.

Furthermore, in the case of a broadcast program to which is appended descriptor information for searching that consists of URL address information, this URL address information is extracted, and the user is connected to the website that is specified by the URL address information.

Next, the case of a digital television broadcast program to which is appended descriptor information for searching that consists of several superimposed layers of items relating to the subject matter will be explained. Let it be assumed that coarse type, medium type, and fine type items are appended. For the convenience of description, it is assumed in the following explanation that when a request for obtaining detailed information is performed by the user operating the remote control 2, keywords "animal", "mammal", and "animal C" are transmitted in order from the DIRD 5 to the CPU 6 as the above described coarse type item, medium type item, and fine type item.

In such a case, first the CPU 6 searches, using the website reference table that is stored in the flash memory 8, for an address for connection that corresponds to the coarse type item "animal", and, if such an address is found, loads the address into the browser and activates the browser. After connecting to the website whose address is stored in correspondence with the coarse type item "animal", the CPU 6 transfers to a search engine that is present at the website to which connection has been established the medium type item "mammal" and the fine type item "animal C", and the search engine to which connection has been established performs an AND search for finding the address of a website that corresponds to the keywords "mammal" and "animal C" that have thus been transferred as search items. When the address of a website that is found by the AND search has been obtained, an appropriate procedure is performed for jumping to the website by the browser, and the contents of the detailed information website that corresponds to the descriptor information for searching is displayed upon the TV 1.

In this manner, in the case of a digital television broadcast program to which is appended descriptor information for searching that consists of several superimposed layers of items relating to the subject matter, after connecting to a website whose address corresponds to the coarse type item for searching, the medium type item and the fine type item for searching are transferred to a search engine that is provided at the website to which connection has been established, and, by making use of the search engine of the website to which connection has been established and to which these search items have been transferred, the address of a further website that corresponds to the medium type item and the fine type item for searching is obtained. Thus, it is possible to reduce the amount of information that must be inscribed in the website information table in the flash memory 8, and thus it is possible to reduce the capacity of the flash memory 8, and hence it is possible to reduce the cost of the apparatus as a whole.

Next, the case in which a detailed information website that has been determined based upon descriptor information for searching that is appended to a digital television broadcast program has the function of offering a plurality of different types of service will be explained with reference to FIG. 3. FIG. 3 is a diagram showing an example of display of contents that has been received from a website to which connection has been established by the TV broadcast cooperative type data perusal apparatus shown in FIG. 1.

When connection has been established to a website that has the function of providing, in this example, the three types of service "display", "print", and "card", as shown in FIG. 3, upon the TV 1, a page is displayed on the screen of the TV 1 that corresponds to the website to which connection has been established. On this page, icons 31, 32, and 33 are displayed for selecting the above described services "display", "print", and "card", respectively. Here, it is possible for the user to benefit from the service that he desires by operating the remote control 2 to select the icon corresponding to the desired service. For example, if he selects the icon 31 for "display", then picture information about the animal that has been selected is downloaded and is displayed upon the TV 1. Furthermore, if he selects the icon 32 for "print", then detailed picture information is downloaded and is printed by the printer 12. Still further, if he selects the icon 33 for "card", then a selection screen is opened and a plurality of thumbnail images are displayed upon the TV 1. When the user selects a desired one of these thumbnail images upon the selection screen by using the remote control 2, the selected image is downloaded and is printed by the printer in card format.

In this manner, if a plurality of services are offered by the detailed information website to which connection is established, the user is enabled to easily obtain the contents that he desires, by selecting the desired service from among the plurality of services.

The operations in the case of the various types of broadcast program described above are performed by the CPU 6 executing program code that is stored in the flash memory 8.

A basic flow chart for the procedure followed by the CPU 6 for the above described operations is shown in FIG. 4.

First, in a step S1, the descriptor information for searching that has been transmitted from the DIRD 5 is inputted. However, as described above, the CPU 6 normally does not perform any procedures related to the descriptor information for searching that has thus been inputted. And, in a step S2, a determination is made as to whether or not there has been accepted an interrupt due to the user operating the remote control 2 (i.e. an interrupt that is generated by the user when during a program broadcast he sees some subject in which he experiences an interest, in order for him to peruse contents related to the subject); and if no such interrupt has been accepted, then the process returns to the step S2. On the other hand, when such an interrupt is accepted, the process proceeds to the next step S3.

In the step S3, the descriptor information for searching input at the time point when the interrupt was accepted is extracted from the descriptor information for searching that has so far been inputted, and then the process proceeds to the next step S4, in which a determination is made as to whether or not the descriptor information for searching consists of URL address information. Here, if the descriptor information for searching does not consist of URL address information, then the process proceeds to the next step S5, in which a process is performed for determining the website to which connection is to be established.

In this connection website determination process, the CPU 6 refers to the website reference table in the flash memory 8, and searches for the keyword that matches the descriptor information for searching that has been obtained. Here, when the keyword matching the descriptor information for searching that has been obtained has been located in the website reference table, the detailed information website address that is set in correspondence with the keyword is determined as the website address for connection. Furthermore, if no such detailed information website is present in the website reference table, but a website of a closely related genre is present, then its related general information website address is determined as the website address for connection. Still further, if a coarse type item, a medium type item, and a fine type item are appended to the descriptor information for searching, then a website address for connection that corresponds to the coarse type item is searched for by using the website reference table stored in the flash memory 8, and if such a website address is found, then the website address is determined as the website address for connection.

Next, the process proceeds to the step S6, in which a determination is made as to whether or not a website address for connection has been determined by the above described connection website determination process. If in fact a website address for connection has been determined, then the process proceeds to a step S7, in which the website address that has been determined is loaded into the browser and the browser is activated, and in the next step S8 connection is established to the website via the modem 7, and the contents therein is downloaded and displayed upon the TV 1.

Now, although no procedure after display of the website content is shown in the figure, after this display, in the case of a digital television broadcast program to which descriptor information for searching is appended that consists of several superimposed layers of items relating to the subject matter, the medium type item and the fine type item for searching are transferred to a search engine that is provided at the website whose address corresponds to the coarse type item for searching, and, by making use of the search engine of the website to which connection has been established and to which these search items have been transferred, it is possible to obtain the address of a further website that corresponds to the medium type item and the fine type item. Furthermore, if the website to which connection has been established is one that offers a plurality of different types of service, the user is enabled to easily obtain the contents that he desires, by selecting the desired service from among the plurality of services.

If in the above step S6 it is determined that no website address for connection has been determined, in other words, no website address that corresponds to the descriptor information for searching has been found in the website information table stored in the flash memory 8, then the process proceeds to a step S9, in which a screen display is provided that informs the user that no detailed information website exists, and the browser is not activated. Then the process is returned-to the first step S1.

If in the above step S4 it is determined that in fact the descriptor information for searching does consist of URL address information, then the process proceeds to the step S7, in which the address specified by the URL address information is loaded into the browser and the browser is activated, and, as before, in the subsequent step S8, connection is established to the specified website via the modem 7, and the contents therein is downloaded and displayed upon the TV 1.

Next, a second embodiment of the present invention will be described with reference to FIG. 5. FIG. 5 is a diagram showing an example of contents of a website reference table stored in a flash memory that is provided in a TV broadcast cooperative type data perusal apparatus according to the second embodiment.

In the above described first embodiment, it was presupposed that it was possible to make a restricted search for some single subject by a single item of descriptor information for searching being appended during program broadcast, but for some broadcast programs it may be the case that a plurality of descriptor information items for searching are appended. For example, the case must be considered in which, while viewing a broadcast program upon the subject of animals, as descriptor information for searching, both animal name information (for example, "elephant") and also area name information (for example, "Africa") are extracted. In this case, it is not clear in which of these matters the user has experienced an interest. Thus, in the second embodiment, genre information that corresponds to keywords that agree with the descriptor information for searching that was detected at the time point when the user operated the remote control 2 (in this case "elephant" and "Africa") is searched from the website information table in the flash memory 8, and the keywords that have been obtained as the results of the search are displayed upon on the TV 1 as a selection screen. Then, when the user selects genre information upon the selection screen, the address of the detailed information website that corresponds to the selected genre information is loaded into the browser, and the browser is activated.

Thus, since the genre information that corresponds to the keywords that respectively correspond to the descriptor information for searching that has been extracted is displayed as the above selection screen, thereby, in the second embodiment, a website reference table shown in FIG. 5 is employed.

In the website information table shown in FIG. 5, keywords (items of descriptor information for searching), items of genre information expressed in the Japanese language so as to make it easy for a Japanese speaking user to decide upon these keywords, and detailed information website addresses are stored in correspondence with one another. For example, with regard to animal A, "animal A" is shown in the Japanese language. However, with regard to keywords for which corresponding detailed information websites are not present in the website information table, a common website address is stored for each such genre, in the same way as in the website information table shown in FIG. 2.

In this manner, when a plurality of items of descriptor information for searching have been extracted, the Japanese language genre information that corresponds to each of these items of descriptor information for searching is displayed using the above described selection-screen, and the user is able to select upon the selection screen the descriptor information for searching that relates to the subject about which he desires to learn more, so that the user is able to reliably connect to an appropriate website.

Furthermore, by utilizing the website information table of the above described structure, when a plurality of items of descriptor information for searching have been extracted, it becomes possible to display genre information in the Japanese language that corresponds to the various items of descriptor information for searching, so that it is possible to offer to a Japanese speaking user a selection screen in a format that is easy for him to understand.

Although in the above described embodiments, website information tables are used in which keywords (descriptor information for searching) and detailed information website addresses corresponding hereto are stored in one to one correspondence, this is not essential to the concept of the present invention; instead of one to one correspondence, it would alternatively be possible to use a website information table in which a plurality of detailed information website addresses are set in correspondence to a single keyword. In this case, although a plurality of detailed information website addresses would be found in correspondence to a single item of descriptor information for searching, the user would be invited, via a selection screen, to select the website address that he desires among the plurality of website addresses.

It is to be understood that the present invention may also be realized by supplying a system or an apparatus with a storage medium in which program code of-software that realizes the functions of any of the above described embodiments is recorded, and causing a computer (or CPU, MPU) of the system or apparatus to read out and execute the program code stored in the storage medium.

In this case, the program code itself read out from the storage medium realizes the functions of any of the above described embodiments, so that the storage medium storing the program code also constitutes the present invention. The storage medium for supplying the program code may be selected, for example, from a floppy disk, hard disk, optical disk, magneto-optical disk, CD-ROM, CD-R, magnetic tape, non-volatile memory card, ROM, or the program code may be obtained by downloading.

The functions of any of the above described embodiments may be accomplished not only by executing a program code read out by a computer, but also by causing an operating system (OS) that operates on the computer, to perform a part or the whole of the actual operation according to instructions of the program code.

Furthermore, it is to be understood that the program code read out from the storage medium may be written into a memory provided in an expanded board inserted in the computer, or an expanded unit connected to the computer, and a CPU, or the like, provided in the expanded board or expanded unit may actually perform a part or the whole of the operations according to the instructions of the program code, so as to accomplish the functions of any of the above described embodiments.

What is claimed is:

1. A TV broadcast cooperative type data perusal apparatus comprising:

connection means for connecting the apparatus to a television reception device with which a digital television broadcast program to which is appended descriptor information for searching can be viewed, a plurality of items of information arranged in successive layers being appended as the descriptor information for searching to the digital television broadcast program;

extraction means for extracting the plurality of items of information as the descriptor information for searching appended to the digital television broadcast program;

non-volatile storage means storing related website information for determining websites upon the internet that are related to the descriptor information for searching;

determination means for determining as a website upon the internet to which connection is to be established, a website that corresponds to a most significant item of information among the extracted plurality of items of information, based upon the plurality of items of information extracted by said extraction means and the related website information;

internet connection means for establishing connection to the determined website upon the internet to which connection is to be established;

perusal means for transferring as a search condition, all of the less significant items of information that follow the most significant item of information among the extracted plurality of items of information, to a search engine at the determined website to which connection has been established, for downloading contents obtained based upon the search condition by the search engine from the determined website, and for perusing the obtained contents via the television reception device;

display control means for displaying a page that corresponds to the determined website to which connection has been established on a screen of the television reception device, wherein the determined website has a function of providing only three types of service, the displayed page comprises icons representing the three types of service, and the three types of service consist of displaying detailed information about the most significant item of information, printing detailed information about the most significant item of information, and printing in card format a selected thumbnail image from a plurality of thumbnail images relevant to the most significant item of information; and selection means for downloading information corresponding to selected service in response to selection of desired service from the plurality of types of service displayed on the screen.

2. A TV broadcast cooperative type data perusal apparatus comprising:

connection means for connecting the apparatus to a television reception device with which a digital television broadcast program to which is appended descriptor information for searching can be viewed, a plurality of items of information arranged in successive layers being appended as the descriptor information for searching to the digital television broadcast program;

extraction means for extracting the plurality of items of information as the descriptor information for searching appended to the digital television broadcast program;

non-volatile storage means storing related website information for determining websites upon the internet that are related to the descriptor information for searching;

determination means for determining as a website upon the internet to which connection is to be established, a website that corresponds to a most significant item of information among the extracted plurality of items of information, based upon the plurality of items of information extracted by said extraction means and the related website information;

internet connection means for establishing connection to the determined website upon the internet to which connection is to be established;

perusal means for transferring as a search condition, all of the less significant items of information that follow the most significant item of information among the extracted plurality of items of information, to a search engine at the determined website to which connection has been established, for downloading contents obtained based upon the search condition by the search engine from the determined website, and for perusing the obtained contents via the television reception device;

display control means for displaying a page that corresponds to the determined website to which connection has been established on a screen of the television reception device, wherein the determined website has a function of providing only three types of service, the displayed page comprises icons representing the three types of service, and the three types of service comprise displaying detailed information about the most significant item of information, printing detailed information about the most significant item of information, and printing in card format a selected thumbnail image from a plurality of thumbnail images relevant to the most significant item of information; and selection means for downloading information corresponding to selected service in response to selection of desired service from the plurality of types of service displayed on the screen.

* * * * *